(12) United States Patent
Koralek (10) Patent No.: US 7,522,663 B2
(45) Date of Patent: Apr. 21, 2009

(54) BURST ERROR LIMITING FEEDBACK EQUALIZER SYSTEM AND METHOD FOR MULTIDIMENSIONAL MODULATION SYSTEMS

(75) Inventor: Richard William Koralek, Palo Alto, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 766 days.

(21) Appl. No.: 11/078,972

(22) Filed: Mar. 10, 2005

(65) Prior Publication Data

US 2006/0203900 A1    Sep. 14, 2006

(51) Int. Cl.
*H03H 7/30* (2006.01)
(52) U.S. Cl. .................................. 375/233
(58) Field of Classification Search .......... 375/232, 375/233, 332, 316, 371, 147, 148, 261, 348, 375/346, 350; 708/322, 323; 333/18
See application file for complete search history.

(56) References Cited

U.S. PATENT DOCUMENTS

| | | | |
|---|---|---|---|
| 6,604,221 B1 * | 8/2003 | Ueno | 714/771 |
| 6,697,423 B1 * | 2/2004 | Jin et al. | 375/233 |
| 6,983,028 B2 * | 1/2006 | Ahn | 375/326 |
| 7,177,352 B1 * | 2/2007 | Plasterer et al. | 375/232 |
| 2004/0008765 A1 * | 1/2004 | Chung et al. | 375/233 |
| 2004/0013190 A1 * | 1/2004 | Jayaraman et al. | 375/233 |
| 2004/0234002 A1 * | 11/2004 | Yang et al. | 375/263 |

FOREIGN PATENT DOCUMENTS

WO    WO2004/010665 A2    1/2004

OTHER PUBLICATIONS

Antoni Fertner, "Improvement of Bit-Error-Rate in Decision Feedback Equalizer by Preventing Decision-Error Propagation" IEEE Transactions on Signal Processing, vol. 46, No. 7, Jul. 1998.*
Chih-Hsiu Lin and An-Yeu (Andy) Wu "Robust Decision Feedback Equalizer Design Using Soft Threshold-based Multi-Layer Detection Scheme", National Taiwan University, Tapei, Taiwan, 2004 IEEE.*

(Continued)

*Primary Examiner*—Chieh M Fan
*Assistant Examiner*—Aristocratis Fotakis
(74) *Attorney, Agent, or Firm*—Lisa K. Jorgenson; Bryan A. Santarelli (57) ABSTRACT

A burst error limiting symbol detector system includes a symbol detector circuit responsive to a corrected sample signal for detecting multilevel or multidimensional symbols encoded in the corrected sample signal with reference to a plurality of associated thresholds. A feedback equalizer circuit provides a feedback equalizer signal for cancelling undesired distortion in an input signal. A summing circuit is responsive to the input signal and the feedback equalizer signal to provide the corrected sample signal to the symbol detector circuit. A feedback modification circuit is responsive to the corrected sample being within one of a plurality of valid symbol windows to feed back the detected symbol to the feedback equalizer and is responsive to the corrected sample being within one of plurality of marginal threshold windows to feed back a corresponding intermediate value to the feedback equalizer.

19 Claims, 6 Drawing Sheets

OTHER PUBLICATIONS

Vincent G Rose and Lungford B White, "Robust Decision Feedback Equalisation Using Error Propagation Detection", University of South Australia, Salisbury, Australia, 1999 IEEE.*

European Search Report, EP06251137, Jun. 22, 2006.

Chiani, Marco, Introducing Erasures in Decision-Feedback Equalization to Reduce Error Propagation, IEEE, vol. 45, No. 7, XP011008968, pp. 757-760, 1997.

Zhi, Thian, Mitigating Error Propagation in CDMA Multiuser DFE, IEEE, vol. 1 of 2, Conf. 35, XP010580959, pp. 424-428, 2001.

* cited by examiner

BURST ERROR LIMITING FEEDBACK EQUALIZER SYSTEM AND METHOD FOR MULTIDIMENSIONAL MODULATION SYSTEMS

TECHNICAL FIELD

The present invention relates generally to communications and storage systems and more specifically to reducing error rates of data being transferred or stored in such systems.

BACKGROUND OF THE INVENTION

In modern digital data transmission channels, such as communications channels and hard disk read and write channels, digital signal processing circuits and methods are utilized to provide accurate and reliable transfer of data over such channels. A data transmission channel may be viewed generally as including an encoder/transmitter which receives data input in the form of symbols corresponding to information to be transferred. The encoder/transmitter encodes these symbols for transmission over a physical transmission channel such as a telephone line, coaxial cable, or bus in a computer system. A decoder/receiver coupled to the physical transmission channel receives the encoded symbols being transferred and decodes these symbols to provide the original data input to other circuitry in the decoder/receiver.

Electrical signals corresponding to the symbols being transferred over the physical transmission channel may experience noise and distortion as these signals propagate over the channel. In fact, as the symbols propagate over the physical transmission channel they may be severely distorted by the channel. As modern digital data transmission channels operate at increasingly faster data rates the transitions associated with sequential symbols occur closer together in time, making it more difficult to filter out channel noise and distortion to properly identify the symbols and thereafter obtain the originally transmitted data at the decoder/receiver.

The decoder/receiver typically includes a filter that removes noise from the received electrical signal to provide a filtered signal. An analog-to-digital (A/D) converter samples the filtered signal to provide a series of samples that collectively form a digital representation of the filtered signal. Digital signal processing (DSP) circuitry receives these samples and processes the samples to determine the corresponding values of the symbols being communicated over the physical transmission channel. More specifically, the DSP circuitry typically includes a "data slicer" or decision block that determines a value of respective symbols from the corresponding samples. The DSP circuitry also typically includes a feed forward equalizer (FFE) that adjusts the values of current samples being processed to compensate for precursor intersymbol interference, as will be described in more detail below. The DSP circuitry further typically includes a decision feedback equalizer (DFE) that generates a feedback signal from weighted values of previously detected symbols to adjust the current values of samples being evaluated to detect a current symbol, as will also be described in more detail below. A decoder decodes the detected symbols to provide decoded data output that ideally is identical to the original data input supplied to the encoder/transmitter.

The performance of the data transmission channel depends on how accurately the samples represent the original electrical signals corresponding to these symbols. Noise and distortion introduced by the physical transmission channel affects the electrical signals propagating over the channel and in this way may adversely affect the values of the samples and thereby the overall performance of the channel. One type of interference that the physical transmission channel can introduce is known as intersymbol interference (ISI), which results from the temporal spreading of the signal corresponding to each "symbol" being communicated over the physical transmission channel. This temporal spreading of individual symbols results in the overlap of adjacent symbols propagating over the physical transmission channel, making it difficult for the decoder/receiver to reliably determine the value of each individual received symbol. Two types of ISI can occur in a given symbol being processed: post-cursor ISI and precursor ISI. Post-cursor ISI is the effect that prior symbols have on a current symbol being processed. Precursor ISI is the effect of subsequent symbols on the current symbol being processed, which occurs due to the different velocities at which different frequency components of each symbol travel over the physical transmission channel, as will be appreciated by those skilled in the art.

One approach that has been utilized to overcome the phenomena of precursor ISI is the use of a feed forward equalizer (FFE) which adjusts the value of a current sample being processed using weighted values of subsequent samples to thereby adjust the values of current sample and compensate for precursor ISI. A common approach that has been utilized to overcome the phenomena of post-cursor ISI is the use of a decision feedback equalizer (DFE). As previously mentioned, a DFE generates a feedback signal from weighted values of previously detected symbols. This feedback signal is utilized to adjust the current values of samples being evaluated to detect a current symbol. More specifically, the DFE generates the feedback signal having a value that subtracts out the ISI from prior symbols on a sample of a current symbol that is being evaluated. The effect of this is to eliminate the contributions of prior symbols on the given sample to more reliably determine a value for the given sample, as will be described in more detail below. The decision block compares the adjusted value of the given sample to predetermined detection thresholds to determine the value of the symbol being detected. For example, in a four level pulse amplitude modulation ("4-PAM) system, the decision block determines whether the adjusted sample corresponds to one of four permissible levels, such as +1, −1, +3, or −3, each level corresponding to a particular symbol. In this way, the DFE feeds back weighted values of current decisions that the decision block then utilizes in determining a value for the symbol corresponding to the current sample being processed, hence the name "decision feedback" equalizer.

A problem can arise from the recursive or feedback nature of the decision block operating in combination with the DFE. More specifically, the DFE utilizes past decisions from the decision block to generate a feedback signal that is intended to cancel post-cursor intersymbol interference (ISI), where post-cursor ISI is the effect that prior symbols have on a subsequent symbol as previously discussed. The decision block makes an optimal determination of the value of current symbol only when all past determinations are correct. If any of these prior determinations was in error, there is a likelihood that the DFE will generate a feedback signal which instead of cancelling post-cursor ISI will actually increase or compound such ISI. As a result, further errors known as burst errors can be generated by conventional DFEs. Burst errors are a sequence of errors that result from a single symbol error. Due to the feedback utilized by the DFE, a first wrong decision for a current symbol affects the value of the feedback signal that is used to adjust the value of the next symbol to be processed. As a result, this first wrong decision could result in a second wrong decision for the next symbol, which in turn could lead to yet another wrong decision for the following symbol, and so on, causing a sequence of wrong decisions that will be referred to as a burst error herein. The duration of a burst error is characterized by the burst error length measured by the number of symbols that may contain faulty decisions.

One approach to reduce burst error lengths in binary systems is to adjust the value of the feedback signal from the DFE when the value of the sample being detected is within an uncertainty window around a detection threshold. For example, assume the detection threshold is 0 volts and that when the sample is greater than 0 the decision block determines the detected value is +1 and when the sample is less than 0 the detected value is −1. The values +1 and −1 correspond to the binary values being detected. If the current sample is within the uncertainty window around the 0 threshold, the DFE adjusts the value of the feedback signal (e.g., by feeding back a 0 instead of a +1 or −1) so that the next sample being processed by the decision block will be processed differently based upon the adjusted feedback signal. Such an approach reduces the length and the likelihood of burst errors in binary systems.

There is a need for reducing the numbers of errors generally and reducing the length and likelihood of burst errors specifically in communications systems utilizing other than binary signals, such as those using multilevel modulation techniques like four level pulse amplitude modulation (4-PAM) and multidimensional modulation techniques like quadrature amplitude modulation (QAM).

SUMMARY OF THE INVENTION

According to one aspect of the present invention, a burst error limiting symbol detector system includes a symbol detector circuit responsive to a corrected sample signal for detecting multilevel or multidimensional symbols encoded in the corrected sample signal with reference to a plurality of associated thresholds. A feedback equalizer circuit provides a feedback equalizer signal for cancelling undesired distortion in an input signal. A summing circuit is responsive to the input signal and the feedback equalizer signal to provide the corrected sample signal to the symbol detector circuit. A feedback modification circuit is responsive to the corrected sample being within one of a plurality of valid symbol windows to feed back the detected symbol to the feedback equalizer and is responsive to the corrected sample being within one of plurality of marginal threshold windows to feed back a corresponding intermediate value to the feedback equalizer.

DETAILED DESCRIPTION OF PREFERRED EMBODIMENTS

Figure 1:
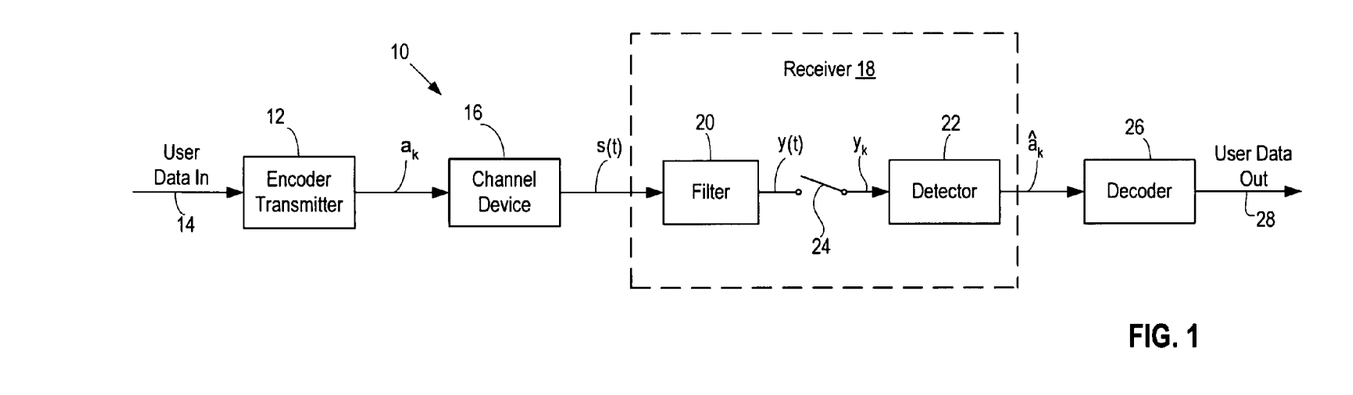
FIG. 1 is a functional block diagram of a communications channel including a receiver according to one embodiment of the present invention.

FIG. 1 is a functional block diagram of a communications channel 10 including a receiver 18 according to one embodiment of the present invention. The receiver 18 includes a burst error limiting symbol detector 22 that reduces burst error length by preventing marginal detected multilevel and/or multidimensional symbols $â_k$ from entering a feedback loop (not shown) where they can contribute to distortion in the values of samples of a current symbol being detected. The symbol detector 22 may do this by feeding back predetermined values based upon detection of a value of the current symbol $â_k$ being within one of a plurality of marginal threshold windows or by basing the value for the detected symbol $â_k$ on the original value of a corresponding sample instead of a value adjusted by a feedback value, as will be described in more detail below.

In the present description, the terms multilevel and/or multidimensional symbols are used broadly to include any type of symbol other than binary symbols, and thus include but are not limited to QAM and PAM type symbols. Also note that in the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well known components and/or processes has not been shown or described in detail below to avoid unnecessarily obscuring the present invention. Throughout the specification and the drawings, like parts may be given like numbers and similar parts like numbers accompanied by a prime or one or more lower case letters.

Figure 2:
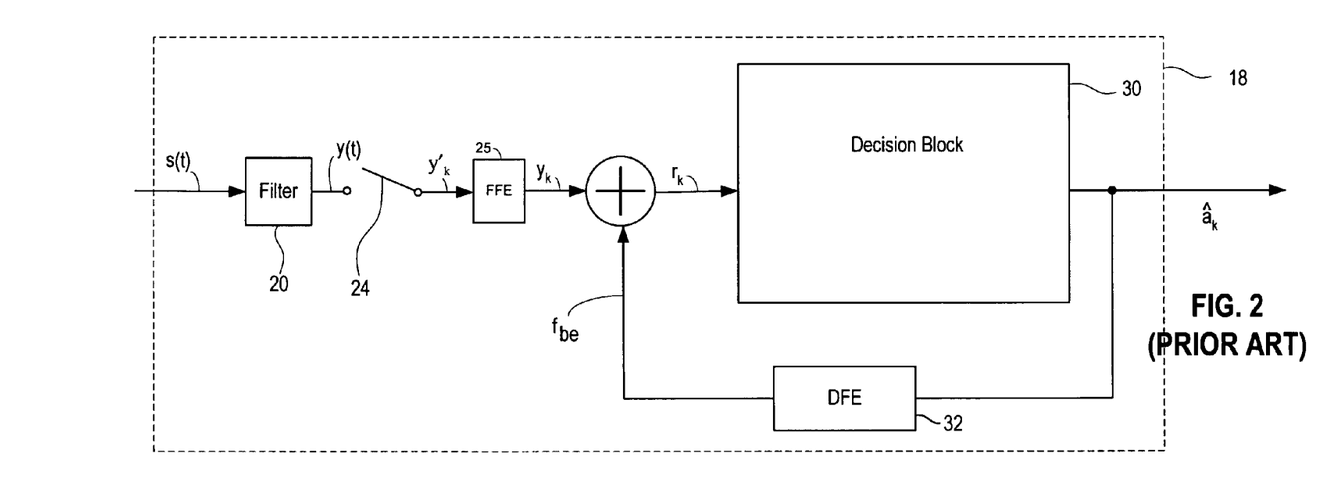
FIG. 2 is a more detailed functional block diagram of a conventional version of the receiver of FIG. 1 including a conventional decision feedback equalizer (DFE).

Before describing the burst error limiting symbol detector 22 in more detail, the overall operation of the communications channel 10 will briefly be discussed along with the operation of a conventional decision feedback equalizer (DFE) with reference to FIGS. 2 and 3. The communications channel 10 includes an encoder transmitter 12 that receives user data at an input 14 and provides at its output an encoded signal in the form of an original symbol $a_k$. A channel device 16 receives the symbols $a_k$ from the transmitter 12, where the channel device may be, for example, a communications channel such as a phone line, coaxial cable, wireless link, and other suitable types of channels. The channel device 16 introduces noise and distortion into the symbol $a_k$ and at the output of the channel device the symbol now appears as a somewhat changed signal designated s(t). The signal s(t) is applied to the receiver 18 which includes a receive filter 20 and the detector 22. The filter 20 filters the signal s(t) to generate a filtered signal y(t) and this filtered signal is sampled by a sampling device 24 such as an analog-to-digital converter, which is shown schematically as a switch. The samples of the filtered signal y(t) from the sampling device 24 are designated $y_k$ and these samples are applied to the detector 22 which, in turn, processes these samples to provide restored original symbols designated $â_k$. A decoder 26 receives the restored original symbols $â_k$ and decodes these symbols to generate the original user data at an output 28.

FIG. 2 is a more detailed functional block diagram of a conventional version of the receiver 18 of FIG. 1 including a conventional decision feedback equalizer (DFE) 32 and a conventional feed forward equalizer (FFE) 25 as is typical for receivers in conventional communications systems. This conventional version of the receiver 18 and will now be described to enable those skilled in the art to better appreciate the differences between the operation of a receiver including a conventional DFE 32 and the operation of a receiver including a DFE according to embodiments of the present invention, as will be described in more detail below with reference to FIGS. 5-7. The receiver 18 includes the filter 20 and sampling device 24 that operate as previously described with reference to FIG. 1. The samples from the sampling device 23 are designated $y'_k$ and are input to the FFE 25 which, as previously described, adjusts the value of a current sample $y_k$ being processed using weighted values of subsequent samples ($y_{k+1}$ and so on) to thereby adjust the value of the current sample $y_k$ to compensate for precursor ISI. A summer 33 receives each adjusted sample $y_k$ from the FFE 25 and sums each sample $y_k$ with a feedback signal $f_{be}$ generated by a decision feedback equalizer (DFE) 32. The summer 33 generates a corrected sample signal $r_k$ that is equal to the sum of the feedback signal $f_{be}$ and the sample $y_k$, and applies this corrected sample signal to the decision block 30. The decision block 30 compares the corrected sample signal $r_k$ to a plurality of thresholds and generates a value for the detected multilevel or multidimensional symbol $â_k$ in response to this comparison.

Figure 3A:
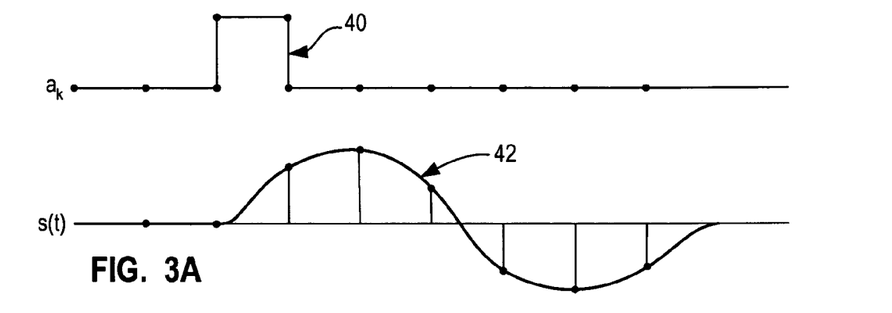
FIGS. 3A-D illustrate a number of waveforms associated with the operation of the conventional DFE of FIG. 2.
Figure 3B:
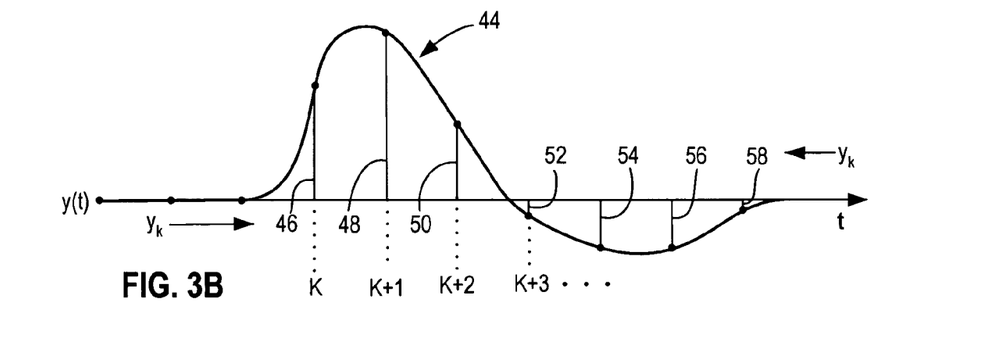

The operation of the conventional DFE 18 is better understood with reference to the illustrative waveforms in FIGS. 3A-E. An original symbol $a_k$ input to the channel device 16 of FIG. 1 appears as a pulse signal 40 in FIG. 3A. Output from the channel device 16 is the somewhat changed signal s(t) represented as a severely distorted signal 42, with such distortion being caused by a variety of factors including bandwidth limiting characteristics of the channel device and the receiver 18, as will be appreciated by those skilled in the art. The filter 20 filters the signal s(t) to generate the filtered signal y(t) as shown in FIG. 3B, and the switching circuit 24 samples this filtered signal to provide the samples $y_k$ of the filtered signal. FIG. 3B shows samples 46, 48, 50, 52, 54, 56 and 58 of the filtered signal y(t) taken at sample times k, k+1, k+2, k+3, k+4, k+5, and k+6, respectively.

Figure 3C:
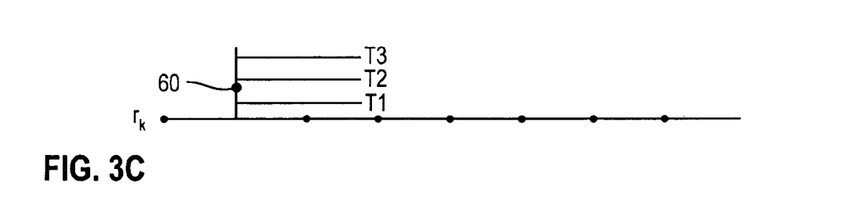

The DFE 32 calculates the feedback signal $f_{be}$ from the detected values of prior symbols $â_{k-1}$ and so on, and subtracts the effects (i.e., the post cursor ISI) of these prior symbols on the sample $y_k$ at the time k. The summer 33 then sums the sample $y_k$ and feedback signal $f_{be}$ to generate the corrected sample signal $r_k$ having a value that ideally is equal to the actual value of that sample for the symbol $a_k$ being detected. For example, in a 4-PAM system the corrected sample signal $r_k$ has one of the values +1, −1, +3, −3. The decision block 30 compares the corrected sample signal $r_k$ to a plurality of threshold values T1-T3 in the example of FIG. 3C. The decision block 30 generates a value for the restored original symbol $â_k$ based upon this comparison. In the example of FIG. 3C, when the decision block 30 determines the corrected sample signal $r_k$ is less than the threshold value T1 the decision block generates a −3 for the restored original symbol $â_k$. When the decision block 30 determines the corrected sample signal $r_k$ is between the thresholds T1 and T2, the decision block generates a −1 for the restored original symbol $â_k$. Similarly, when the decision block 30 determines the corrected sample signal $r_k$ is between the thresholds T2 and T3, the decision block generates a +1 for the restored original symbol $â_k$ and when the corrected sample signal is greater than the threshold T3 the decision block determines the restored original signal has a value of +3. An example sample 60 of the corrected sample signal $r_k$ is shown in FIG. 3C.

Figure 3D:
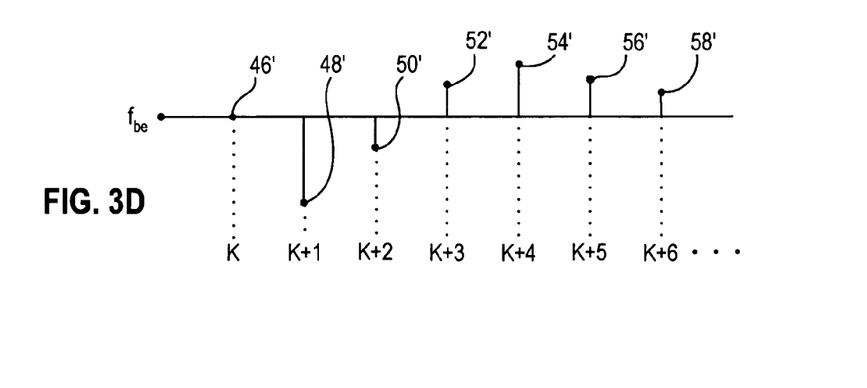

In operation, the DFE 32 generates the feedback signal $f_{be}$ that subtracts the effects of prior symbols (i.e., post cursor ISI) from the current sample $y_k$ being evaluated at time k. The signal corresponding to the symbol at time k is shown in FIG. 3B. This symbol causes post cursor ISI at times k+1, k+2, k+3, k+4, k+5, and k+6 having values as shown for samples 48-58 in FIG. 3B. Referring now to FIG. 3D, the operation of the DFE 32 in removing the post cursor ISI caused by the given symbol at time k is illustrated. The symbol at time k causes post cursor ISI corresponding to the samples 48-58, and when evaluating subsequent symbols at times k+1, k+2 and so on the DFE 32 subtracts post cursor ISI of the symbol at time k from the sample $y_k$ being evaluated. As a result, in operation the DFE 32 subtracts out the value of the sample 48' when evaluating the symbol at time k+1 to remove the post cursor ISI caused by the symbol at time k from the sample 48' at time k+1. Similarly, the DFE 32 subtracts out the value of the sample 50' when evaluating the symbol at time k+2 to remove the post cursor ISI caused by the symbol at time k from the sample 50' at time k+2. The DFE 32 operates in the same way for samples 52'-58' at times k+3 to k+6 to remove the post cursor ISI caused by the symbol at time k on these samples. This operation is depicted in FIG. 3D, with the samples 48'-58' being mirror images or negative versions of the samples 48-50 of FIG. 3B to subtract out each of these samples from the respective sample being evaluated. Note the DFE 32 does this for all prior symbols that cause post cursor ISI in the sample being evaluated, and not just for the symbol at time k. In other words, when the symbol at time k+1 is being evaluated the DFE 32 subtracts out the post cursor ISI of the symbol a time k (i.e., sample 48') and also subtracts out the post cursor ISI of the symbol at time k−1, of the symbol at time k−2, and so on. The overall value of the feedback signal $f_{be}$ equals the sum of all the individual post cursor ISI components from all prior symbols that affect the given sample being evaluated.

In evaluating the current sample $y_k$ at time k, the DFE 32 generates the feedback signal $f_{be}$ that subtracts out the post cursor ISI of prior symbols on this sample at time k. The prior symbols $a_{k-1}$, $a_{k-2}$, $a_{k-3}$, $a_{k-4}$, and so on at these prior times generate post cursor ISI that interferes or distorts the value of the sample $y_k$ at time k. The DFE 32 generates the feedback signal $f_{be}$ that removes the affects of this post cursor ISI from the sample $y_k$. In other words, the post cursor ISI from prior symbol $a_{k-1}$ on the sample $y_k$ is subtracted, the post cursor ISI of prior symbol $a_{k-2}$ on the sample $y_k$ is subtracted, and so on.

Figure 4:
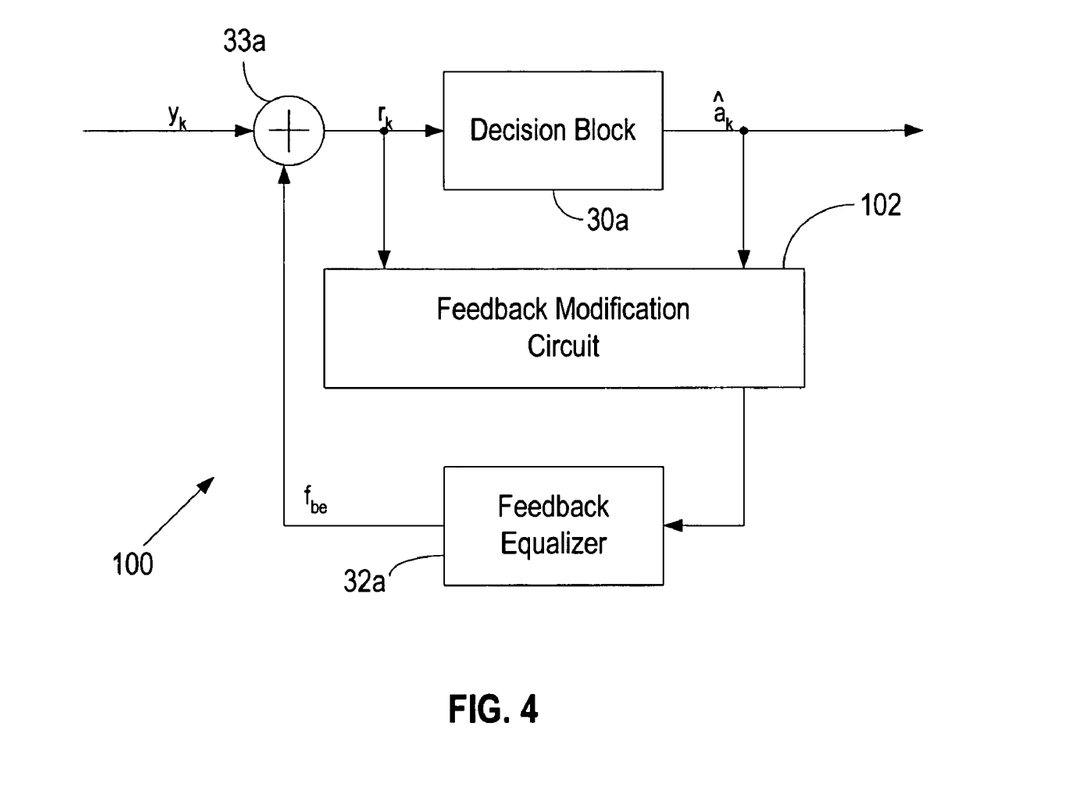
FIG. 4 is a simplified block diagram of a burst error limiting symbol detector system including a feedback modification circuit according to one embodiment of the present invention.

FIG. 4 is a simplified block diagram of a burst error limiting symbol detector system 100 including a feedback modification circuit 102 according to one embodiment of the present invention. In operation of the burst limiting error symbol detector system 100, a decision block 30a compares a corrected sample signal $r_k$ to a plurality of thresholds T (not shown) and generates a restored original symbol $â_k$ in response to these comparisons. Similarly, the feedback modification circuit 102 compares the corrected sample signal $r_k$ to a plurality of marginal thresholds MT (not shown) to thereby determine whether the corrected sample signal falls within any one of a plurality of defined marginal threshold windows MTWs (also not shown). If the corrected sample signal $r_k$ does not fall within any of the defined marginal threshold windows MTWs, the feedback modification circuit 102 applies the restored original symbol $â_k$ to the DFE 32a, which thereafter operates as previously described to generate the feedback signal $f_{be}$ using the value of this restored original symbol.

When the feedback modification circuit 102 determines the corrected sample signal $r_k$ falls within any of the defined marginal threshold windows MTWs, the feedback modification circuit 102 does not apply the restored original symbol $â_k$ to the DFE 32a. Instead, the feedback modification circuit 102 applies an alternative feedback value to the DFE 32a, where the alternative feedback value can be determined in a variety of different ways. For example, the modification circuit 102 could provide an intermediate value based on which marginal threshold window MTW contains the corrected sample signal $r_k$. For example, in a 4-PAM embodiment valid values of the symbol $â_k$ may be defined as +3, +1, −1, and −3. In this situation, if a marginal threshold window MTW is defined from 1.5 to 2.5 and the corrected sample signal $r_k$ falls within this window, the feedback modification circuit 102 may provide an intermediate value of 2 to the DFE 32a.

In another embodiment, when the feedback modification circuit 102 detects that the corrected sample signal $r_k$ falls within one of the marginal threshold windows MTW, the modification circuit feeds back the sample $y_k$ to the DFE 32a as the intermediate value. In another embodiment, several of these approaches are utilized in combination, with the specific approach utilized depending on the value of the detected corrected sample signal $r_k$. Also note that in another embodiment the marginal threshold windows MTW are dynamically determined by, for example, setting the thresholds based upon the detected values of the symbols $â_k$.

Figure 5:
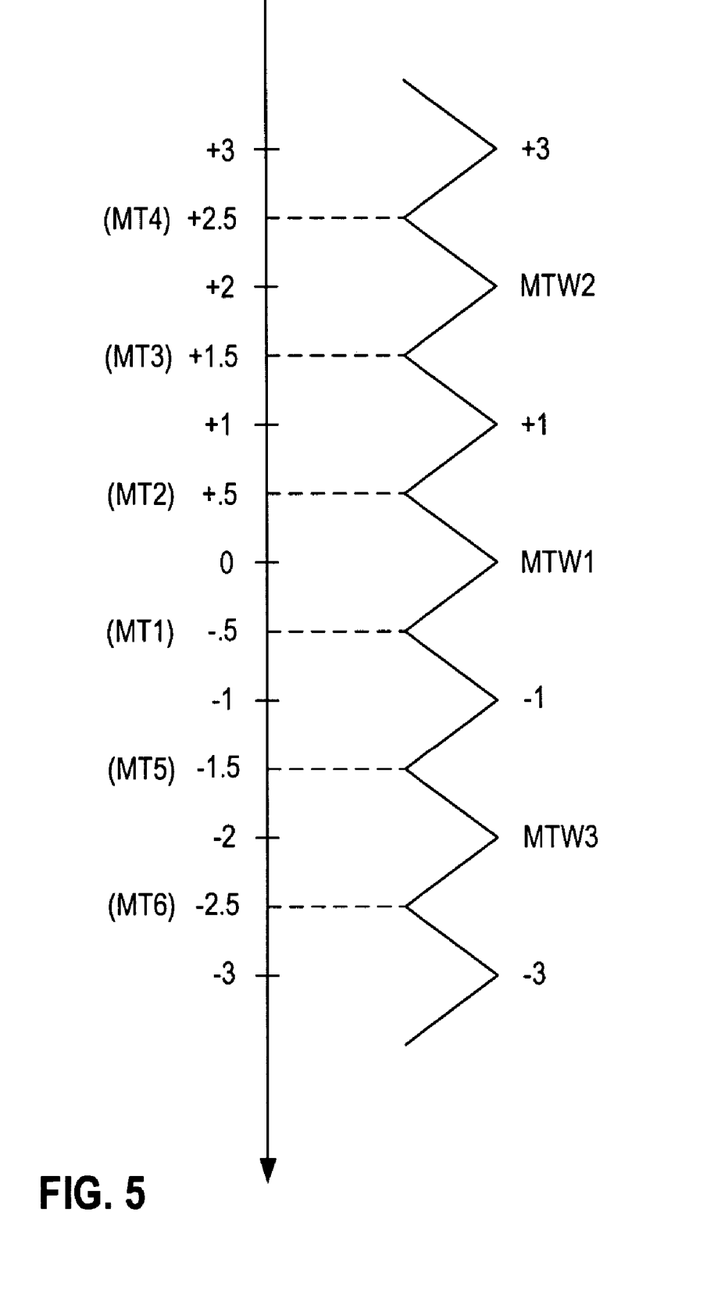
FIG. 5 is a diagram illustrating levels for detected symbols and levels for detection thresholds in a 4-PAM implementation of the burst error limiting symbol detector system of FIG. 4 according to one embodiment of the present invention.

The operation of a 4-PAM embodiment of the burst error limiting symbol detector system 100 of FIG. 4 will now be described in more detail with reference to FIG. 5, which is a diagram illustrating various levels for detected symbols $â_k$ and example marginal threshold windows MTW1-MTW3. The axis in FIG. 5 represents normalized amplitude of the corrected sample signal $r_k$. In operation, the feedback modification circuit 102 compares the corrected sample signal $r_k$ to a plurality of marginal thresholds MT1-MT6, with pairs of the marginal thresholds defining corresponding threshold windows MTW1-MTW3. If the corrected sample signal $r_k$ does not fall within any of the marginal threshold windows MTW1-MTW3, the modification circuit 102 feeds back to the DFE 32a the value of the symbol $â_k$ detected from the corrected sample signal. For example, if the corrected sample signal $r_k$ has a value greater than 2.5, the modification circuit 102 determines the symbol $â_k$ has a value of +3 and feeds back this value of +3 to the DFE 32a. Similarly, when the modification circuit 102 determines the corrected sample signal $r_k$ has values between +0.5 and +1.5, −5 and −1.5, and less than −2.5, the modification circuit 102 determines the symbol $â_k$ has values of +1, −1, and −3, respectively, and feeds back these values to the DFE 32a.

When the feedback modification circuit 102 determines the corrected sample signal $r_k$ falls within one of the marginal threshold windows MTW1-MTW3, the modification circuit 102 feeds back an intermediate value to the DFE 32a. The value of this intermediate value depends upon which one of the marginal threshold windows MTW1-MTW3 contains the corrected sample signal $r_k$. If the corrected sample signal $r_k$ falls within the marginal threshold window MTW1, the modification circuit 102 feeds back a value of 0 to the DFE 32a. The value of 0 is feed back in this example since this is the discrete value the corrected sample signal $r_k$ is closest to when it falls within the window MTW1. Although 0 is not a valid value for the symbol $â_k$ in this embodiment, the corrected sample signal $r_k$ is nonetheless closest to 0 when in the window MTW1 and thus this value is fed back to the DFE 32a. Moreover, feeding back a 0 in this situation corresponds to feeding back an intermediate value between two valid values for the symbol $â_k$, namely the value 0 is midway between the valid values of +1 and 1.

When the corrected sample signal $r_k$ falls within the marginal threshold window MTW2, the modification circuit 102 feeds back a value of +2 to the DFE 32a. Once again, the value of +2 corresponds to a discrete value that the corrected sample signal $r_k$ is closest to and also corresponds to value between two valid values for the symbol $â_k$, namely the value +2 is midway between the valid values of +1 and +3. Finally, when the corrected sample signal $r_k$ falls within the marginal threshold window MTW3, the modification circuit 102 feeds back a value of −2 to the DFE 32a. The value of −2 corresponds to a discrete value that the corrected sample signal $r_k$ is closest to and also corresponds to value between two valid values for the symbol $â_k$, namely the value −2 is midway between the valid values of −1 and −3. In this way, the feedback modification circuit 102 prevents marginal symbols $â_k$ from adversely affecting the detection of future symbols by adjusting the value fed back to the DFE 32a in such situations.

Note that in another embodiment of the system 100, the modification circuit 102 may feed back the corrected sample signal $r_k$ when this signal falls within one of the marginal threshold windows MTW1-MTW3. For example, where the corrected sample signal $r_k$ has a value of +0.25 and thus falls within the window MTW1, the modification circuit 102 feeds back the value +0.25 in this embodiment. In yet another embodiment of the system 100, the modification circuit 102 feeds back the value of the sample $y_k$ when the corrected sample signal $r_k$ falls within one of the marginal threshold windows MTW1-MTW3. One skilled in the art will also understand that FIG. 5 simply represents one example of how the modification circuit 102 may operate according to an embodiment of the present invention. For example, the manner in which the various amplitude ranges are decoded into corresponding symbol $â_k$ may of course vary. Thus, the range from +0.5 to +1.5 may be decoded as other than a +1 for the symbol $â_k$, for example, and the same is true of the other values for the symbols. One skilled in the art will appreciate that the burst error limiting symbol detector system 100 reduces the likelihood of burst error and reduces the length of such burst errors by preventing marginally detected symbols $â_k$ from being fed back through the DFE 32a and thereby adversely affecting the detection of subsequent symbols.

Those skilled in the art will appreciate that the marginal thresholds MT1-MT6 and associated marginal thresholds windows MTW1-MTW3 shown in FIG. 5 are merely examples and may be chosen differently for a variety of different reasons. Moreover, in another embodiment of the system 100 the feedback modification circuit 102 may adaptively determine values for the thresholds MT1-MT6 thereby adaptively define the marginal thresholds windows MTW1-MTW3. For example, known symbol patterns could be communicated to the system 100 during a configuration mode of operation with the modification circuit 102 comparing known values for symbols during this mode detected value and adjusting the thresholds in response to this comparison to optimize overall performance of the system.

Also note that the numbers of marginal thresholds and threshold windows may vary, along with the values fed back by the DFE in response to detecting a symbol within one of the marginal threshold windows. For example, referring to FIGS. 4 and 5, in another embodiment of the system 100 marginal thresholds could be defined at +2.75, +2.25, +1.75, +1.25, +0.75, +0.25, −0.25, −0.75, −1.25, −1.75, −2.25, and −2.75. Each pair of thresholds once again defines a marginal threshold window, with the value the modification circuit 102 feeds back to the DFE 32*a* once again being a function of the marginal threshold window containing the corrected sample signal $r_k$ being evaluated. In this example, the modification circuit 102 may, for example, feed back a value of +3 when the corrected sample signal $r_k$ is greater than +2.75, feed back a value of +2.5 when the corrected sample signal $r_k$ falls between +2.75 and +2.25, feed back a value of +2 when the corrected sample signal $r_k$ falls between +2.25 and +1.75, feed back a value of 1.5 when the corrected sample signal $r_k$ falls between +1.75 and +1.25, feed back a value of 1 when the corrected sample signal $r_k$ falls between +1.25 and +0.75, feed back a value of 0 when the corrected sample signal $r_k$ falls between +0.25 and −0.25, and so on. This is merely another example to illustrate how the numbers and values of the thresholds and associated marginal threshold windows can be varied in the system 100 according to other embodiments of the present invention.

Figure 6:
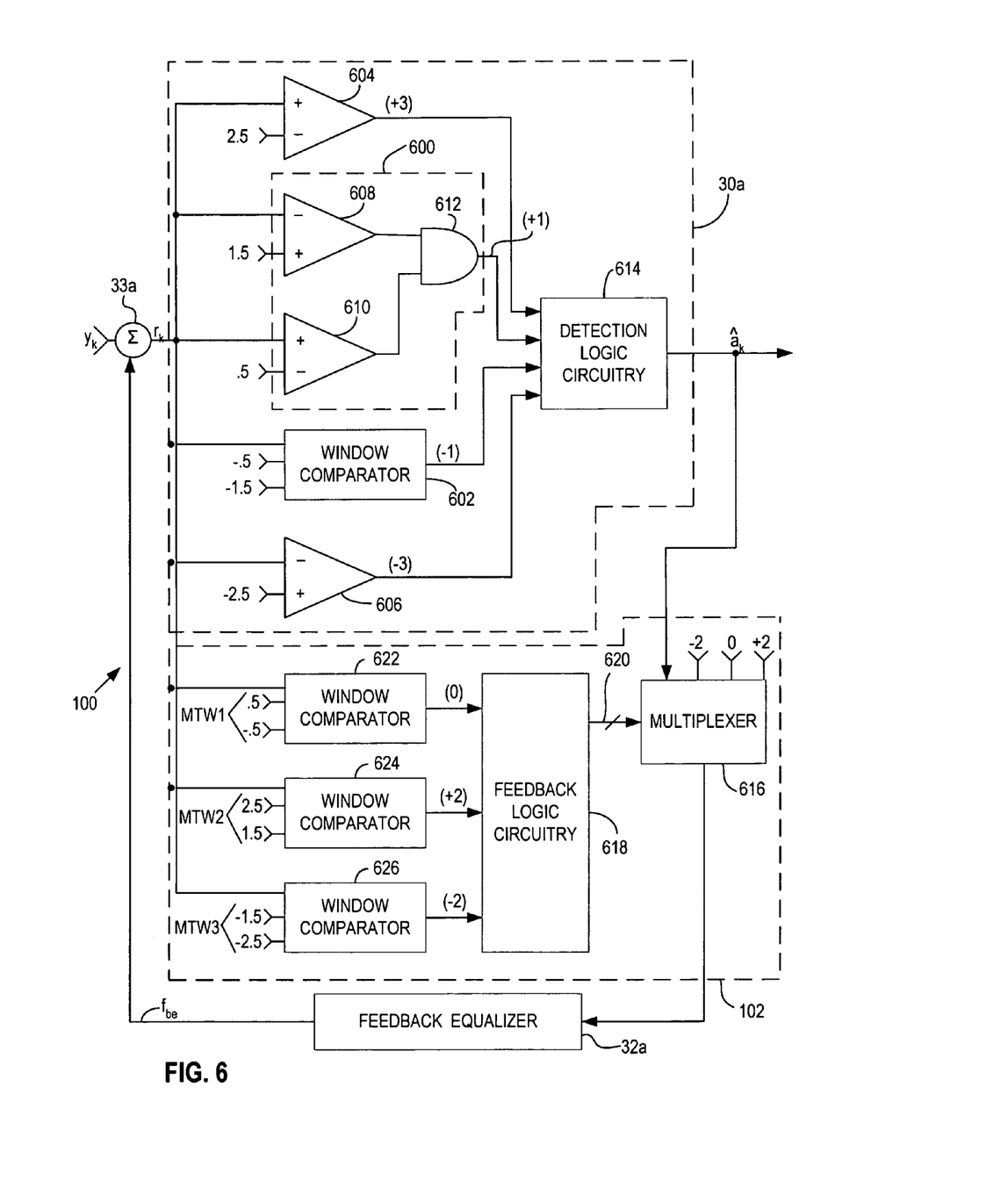
FIG. 6 is a more detailed functional block diagram of the 4-PAM implementation of the burst error limiting symbol detector system of FIG. 5 according to one embodiment of the present invention.

FIG. 6 is a more detailed functional block diagram of the 4-PAM implementation of the burst error limiting symbol detector system 100 of FIG. 5 according to one embodiment of the present invention. More specifically, FIG. 6 shows in more detail one embodiment of the decision block 30*a* and the feedback modification circuit 102. The decision block 30*a* includes two window comparators 600 and 602 and two standard comparators 604 and 606, with each comparator receiving the corrected sample signal $r_k$. The comparators 604 and 606 determine whether the corrected sample signal $r_k$ is greater than 2.5 volts or less than −2.5 volts, respectively. When the comparator 604 determines the corrected sample signal $r_k$ is greater than 2.5 volts, the comparator activates its output signal which is designated as (+3) in FIG. 6 to indicate that when this output signal is active the corrected sample signal has a value corresponding to the valid symbol $â_k$ of +3. Similarly, when the comparator 606 determines the corrected sample signal $r_k$ is less than −2.5 volts, the comparator activates its output signal which is designated as (−3) to indicate that when this output signal is active the corrected sample signal has a value corresponding to the valid symbol $â_k$ of −3.

The window comparators 600 and 602 each determine whether the corrected sample signal $r_k$ falls within an associated valid symbol window defined by two threshold voltages received by the window comparator. More specifically, the window comparator 600 is shown in more detail as including first and second standard comparators 608 and 610. The comparator 608 receives the corrected sample signal $r_k$ on an inverting input while the comparator 610 receives the corrected sample signal on a noninverting input. A first threshold voltage of 1.5 volts is applied to the noninverting input of the comparator 608 while a second threshold voltage of 0.5 volts is applied to the inverting input of the comparator 610, with these two threshold voltages defining the valid symbol window associated with the window comparator 600. The outputs of the comparators 608 and 610 are applied to an AND gate 612 which drives its output active when the outputs from both comparators are active.

In operation, when the corrected sample signal $r_k$ is greater than 0.5 volts the comparator 610 drives its output active and when the corrected sample signal is less than 1.5 volts the comparator 608 drives its output active. Thus, when the corrected sample signal $r_k$ falls within the valid symbol window defined by the threshold voltages 0.5 volts and 1.5 volts, the outputs from both comparators 608 and 610 are active. In response to these two active outputs from the comparators 608 and 610, the AND gate 612 drives its output active. The output of the AND gate 612 is designated as (+1) to indicate that when this output signal is active the corrected sample signal $r_k$ is defined as having a valid symbol $â_k$ value of +1. When either the comparator 608 or 610 drives its output inactive, this means the corrected sample signal $r_k$ does not fall within the valid symbol window defined by the threshold voltages 0.5 volts and 1.5 volts. In this situation, the AND gate 612 drives its output inactive in response to one or both of the outputs from the comparators 608 and 610 being inactive.

The structure of the window comparator 602 is identical to the window comparator 600, and thus, for the sake of brevity, the structure of this window comparator will not be described in more detail. The window comparator 602 receives the threshold voltages −0.5 volts and −1.5 volts to define a corresponding valid symbol window for the valid symbol $â_k$ of −1. The output of the window comparator 602 is designated as (−1) to indicate that when this output signal is active the corrected sample signal $r_k$ is defined as having a valid symbol $â_k$ value of −1.

Detection logic circuitry 614 is the decision block 30*a* receives the outputs from the comparators 600-606 and generates the symbol $â_k$ in response to these outputs. More specifically, when the output of the window comparator 600 is active the detection logic circuitry 614 provides a value of +1 for the symbol $â_k$ and when the output of the window comparator 602 is active the detection logic circuitry provides a value of −1 for the symbol. Similarly, the detection logic circuitry 614 provides a value of +3 for the symbol $â_k$ when the comparator 604 drives its output active and provides a value of −3 for the symbol when the comparator 606 drives its output active.

The symbol $â_k$ from the detection logic circuitry 614 its output from the system 100 and is also applied to the feedback modification circuit 102. A multiplexer 616 in the modification circuit 102 receives the symbol $â_k$ and also receives alternative feedback values of −2 volts, 0 volts, and 2 volts in the example embodiment of FIG. 6. Feedback logic circuitry 618 applies selection signals 620 to the multiplexer 616, and in response to the selection signals the multiplexer provides one of the symbol $â_k$ and the alternative feedback values of −2 volts, 0 volts, and 2 volts to the DFE 32*a*. The alternative feedback values may be predetermined values or may be dynamically determined, and defined values that are fed back to the DFE 32*a* when the corrected sample signal $r_k$ falls within one of the defined marginal threshold windows MTW1-MTW3, as will be described in more detail below.

The feedback logic circuitry 618 develops the selection signals 620 in response to outputs from three window comparators 622-626. The window comparators 622-626 have the same structure as the window comparator 600, and thus, for the sake of brevity, the structure of these comparators will not again be described in detail. Each of the window comparators 622-626 determines whether the corrected sample signal $r_k$ falls within a corresponding one of the marginal threshold windows MTW1-MTW3. The window comparator 622 receives the corrected sample signal $r_k$ along with first and second threshold voltages of −0.5 volts and +0.5 volts that together define the marginal threshold window MTW1. When the corrected sample signal $r_k$ falls within the marginal threshold window MTW1, meaning that the signal is greater than −0.5 volts and less than +0.5 volts, the window comparator 622 activates its output. The output of the comparator 622 is designated (0) since when this output is active the feedback modification circuit 102 feeds back a 0 to the DFE 32a, as will be described in more detail below. When the corrected sample signal $r_k$ falls within the marginal threshold windows MTW2 and MTW3, the window comparators 624 and 626 operate in the same way to activate their respective outputs, which are designated (+2) and (−2), respectively.

The overall operation of the system 100 of FIG. 6 will now be described in more detail. Initially, assume the DFE 32a feeds back an initial feedback signal $f_{be}$ to the summer 33a. The initial value of the feedback signal $f_{be}$ is based upon default values or on previously detected values for the symbols $\hat{a}_k$. At this point, a sample $y_k$ to be evaluated by the burst error limiting symbol detector system 100 is applied to the summer 33a. The summer 33a generates a current value for the corrected sample signal $r_k$ that is equal the current sample $y_k$ being evaluated plus the current value of the feedback signal $f_{be}$. This current value of the corrected sample signal $r_k$ is applied to the decision block 30a and the feedback modification circuit 102.

At this point, the decision block 30a evaluates the corrected sample signal $r_k$ to determine whether the signal falls within any of the valid symbol windows the corresponding one of the comparators 600-606 activates its output. In response to the outputs from the comparators 600-606, the detection logic circuitry 614 generates a current value for the detected symbol $\hat{a}_k$ and this value is output from the system 100 and applied to the feedback modification circuit 102. Within the modification circuit 102, the current value for the detected symbol $\hat{a}_k$ is applied to the multiplexer 616. While the decision block 30a is evaluating the current value of the corrected sample signal $r_k$, the feedback modification circuit 102 is also evaluating this signal. More specifically, the comparators 622-626 determine whether the corrected sample signal $r_k$ falls within any of the defined marginal threshold windows MTW1-MTW3. In response to the outputs from the comparators 622-626, the feedback logic circuitry 618 generates the selection signals 620 to the multiplexer 616 to thereby select the desired value to be applied to the DFE 32a.

When the corrected sample signal $r_k$ does not fall within any of the defined marginal threshold windows MTW1-MTW3, all outputs from the comparators 622-626 are inactive. In this situation, the feedback logic circuitry 618 generates the selection signals 620 that cause the multiplexer 616 to apply the currently detected value of the symbol $\hat{a}_k$ to the DFE 32a. When the corrected sample signal $r_k$ does not fall within any of the marginal threshold windows MTW1-MTW3, the signal necessarily falls within one of the valid symbol windows. This is why in this situation the multiplexer 616 applies the currently detected valid value for the symbol $\hat{a}_k$ to the DFE 32a.

In contrast, when the corrected sample signal $r_k$ falls within any of the defined marginal threshold windows MTW1-MTW3, the corresponding one of the comparators 622-626 activates its output. In this situation, the feedback logic circuitry 618 generates the selection signals 620 that cause the multiplexer 616 to apply the appropriate one of the values −2, 0, or +2 to the DFE 32a. If the corrected sample signal $r_k$ falls within the marginal threshold window MTW1, then the comparator 622 activates its output. In response to the active output from the comparator 622, the feedback logic circuitry 618 generates the selection signals 620 that cause the multiplexer 616 to apply the 0 value to the DFE 32a. This is true because when the corrected sample signal $r_k$ is contained in the marginal threshold window MTW1, the signal is deemed as being closest to a value of 0 and thus the multiplexer 616 feeds back a value of 0 to the DFE 32a. Similarly, when the corrected sample signal $r_k$ falls within the marginal threshold window MTW2 the comparator 624 activates its output. In response to the active output from the comparator 624, the feedback logic circuitry 618 generates the selection signals 620 that cause the multiplexer 616 to apply the +2 value to the DFE 32a since the corrected sample signal $r_k$ is deemed to be closest to a value of +2 in this situation. In the same way, when the corrected sample signal $r_k$ is contained in the marginal threshold window MTW3, the comparator 626 activates its output and the feedback logic circuitry 618 generates the selection signals 620 that cause the multiplexer 616 to apply the −2 value to the DFE 32a. Thus, when the corrected sample signal $r_k$ is contained in the marginal threshold window MTW3 the signal is deemed to be closest to the value −2 and this value is fed back to the DFE 32a.

In response to the current value of the symbol $\hat{a}_k$ or the −2, 0, or +2 value from the multiplexer 616 plus the past detected values of the symbol $\hat{a}_k$, the DFE 32a generates a new value for the feedback signal $f_{be}$. This new value for the feedback signal $f_{be}$ is applied to the summer 33a, which sums this new feedback signal with the next sample $y_{k+1}$ being evaluated to develop a new value for the corrected sample signal $r_k$. The decision block 30a and feedback modification circuit 102 thereafter operate as just described to evaluate this new value of the corrected sample signal $r_k$ and to thereafter apply the proper value to the DFE 32a for evaluation of the subsequent sample $y_{k+2}$ to be evaluated. The system 100 continues operating in this manner to sequentially evaluate samples $y_k$, $y_{k+1}$, $y_{k+2}$, $y_{k+3}$ and so on.

Figure 7:
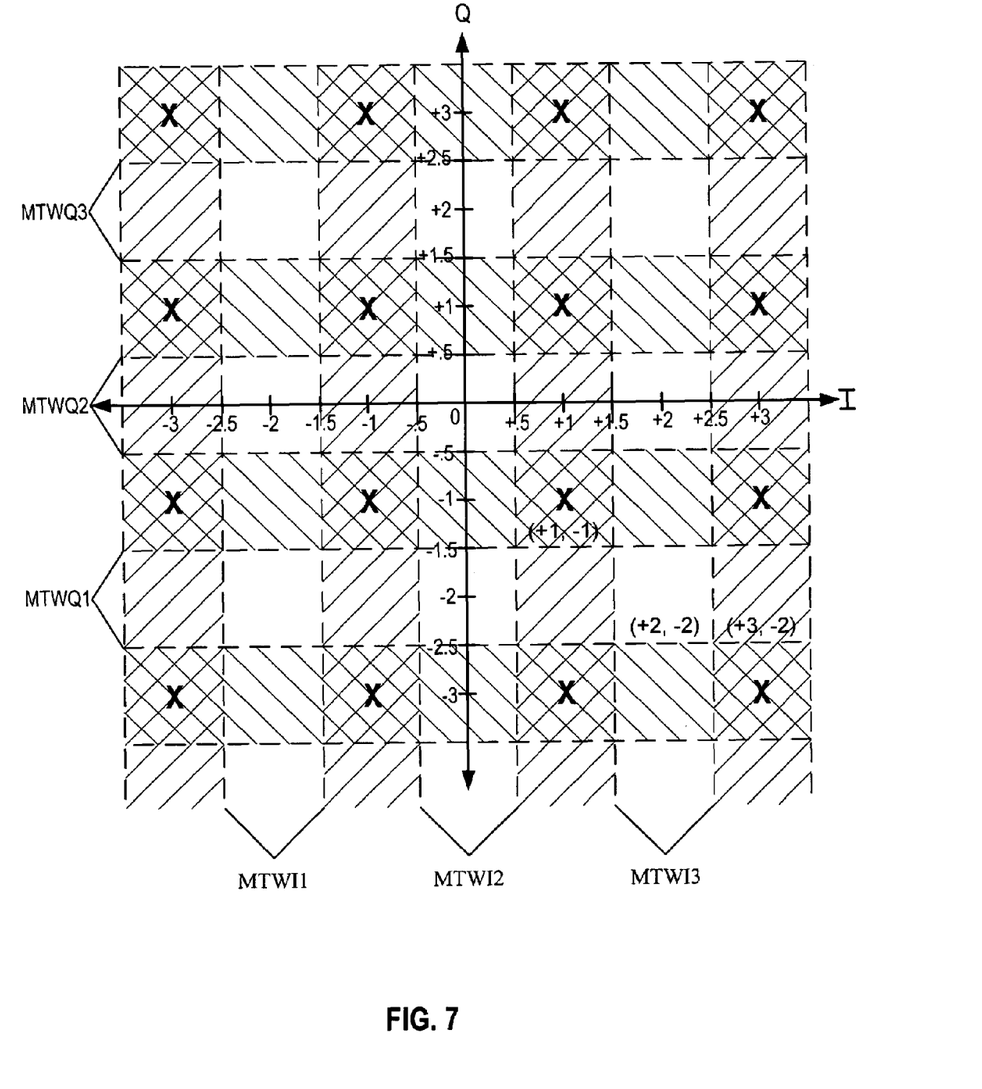
FIG. 7 is a diagram illustrating levels for detected symbols and levels for detection thresholds in a 16-QAM implementation of the burst error limiting symbol detector system of FIG. 4 according to another embodiment of the present invention.

FIG. 7 is a diagram illustrating levels for detected symbols and levels for detection thresholds in a 16-QAM implementation of the burst error limiting symbol detector system 100 of FIG. 4 according to another embodiment of the present invention. As previously described, embodiments of the system 100 include implementations for any multilevel and/or multidimensional modulation technique. Accordingly, the multilevel 4-PAM embodiment discussed with reference to FIGS. 4-6 and the multidimensional and multilevel 16-QAM embodiment that will now be described with reference to FIG. 7 are merely two example embodiments of the present invention. One skilled in the art will understand various other multilevel and/or multidimensional modulation techniques to which aspects of the present invention may be applied.

In the 16-QAM example of FIG. 7, the vertical axis is the Q-axis and the horizontal axis is the I-axis. Along the Q-axis three marginal threshold windows MTWQ1-MTWQ3 are defined and the same is true along the I-axis along which three marginal threshold windows MTWI1-MTWI3 are similarly defined. As will be understood by those skilled in the art, QAM modulation may be viewed as possibly multilevel modulation of two orthogonal carrier signals, designated as an in-phase carrier signal I and a quadrature carrier signal Q. The quadrature carrier signal Q is 90 degrees apart in phase relative to the in-phase carrier signal I. These two carrier signals I and Q may each be termed a dimension and thus modulation techniques involving I and Q carriers may be termed two-dimensional modulation techniques. Each carrier signal I and Q may each be modulated in a variety of different ways, and in QAM each is amplitude modulated. The amplitude modulation may be multilevel, as is in the example of FIG. 7 where each carrier signal I and Q is modulated with 4-PAM. The four amplitude levels for the I carrier and the same for the Q carrier result in a total of 16 possible valid symbols $a_k$ and this type of modulation is termed 16-QAM, with a diagram like that of FIG. 7 being referred to as a constellation of the 16 possible valid symbols. The Xs in FIG. 7 and the double cross hatching around each X indicate the 16 possible valid symbols. Single cross hatching indicates a valid symbol in one of dimensions, i.e., either on the I or the Q carrier, but not on the other carrier, as will be discussed in more detail below.

One embodiment of the system 100 implementing the 16-QAM example of FIG. 7 is formed from two of the systems 100 of FIG. 6, one associated with the I carrier and one with the Q carrier. Each operates independently in the same way as the system 100 of FIG. 6, with suitable circuitry thereafter combining the results to detect the 16 possible valid symbols $â_k$ and to feed back either the detected symbol or an intermediate value in a manner analogous to that described for the system 100 of FIG. 6. For example, when the corrected sample signal $r_k$ for the I carrier falls within the valid symbol window of +0.5 to +1.5 and the corrected sample signal for the Q carrier falls within the valid symbol window of −0.5 to −1.5 the corresponding valid detected symbol $â_k$ is the symbol designated (+1, −1) shown in upper left corner of the fourth quadrant of the constellation of FIG. 7. In this situation, the system 100 feeds back the +1 to the DFE 32a associated with the I carrier and feeds back the −1 to the DFE associated with the Q carrier.

As another example, assume the corrected sample signal $r_k$ for the I carrier falls within the marginal threshold window MTWI3 of +1.5 to +2.5 and the corrected sample signal for the Q carrier falls within the marginal threshold window MTWQ1 of −1.5 to −2.5. These two values for the corrected sample signals $r_k$ are indicated as an invalid symbol designated (+2, −2) shown in middle of the fourth quadrant of the constellation of FIG. 7. In this situation, the system 100 feeds back the +2 to the DFE 32a associated with the I carrier and feeds back the −2 to the DFE associated with the Q carrier. As a final example, assume the corrected sample signal $r_k$ for the I carrier falls within the valid symbol window of >+3 and the corrected sample signal for the Q carrier falls within the marginal threshold window MTWQ1 of −1.5 to −2.5. These two values for the corrected sample signals $r_k$ are indicated as an invalid symbol designated (+3, −2) shown in lower right of the fourth quadrant of the constellation of FIG. 7. In this situation, the system 100 feeds back the valid +3 to the DFE 32a associated with the I carrier and feeds back the invalid −2 to the DFE associated with the Q carrier. In all the above examples, the DFE 32a associated with each carrier I and Q then operates in the same way as described with reference to FIG. 6 to generate the corresponding feedback signal $f_{be}$ which, in turn, is applied to the corresponding summer 33a to adjust the value of the associated the corrected sample signal $r_k$.

Table 1 set forth below illustrates an illustrative example of the ranges or windows associated with each of the valid symbol windows and marginal threshold windows that are associated with each of the I and Q carriers in the example of FIG. 7.

TABLE 1

| I/Q values | Q < −2.5 | −1.5 < Q ≤ −2.5 | −0.5 < Q ≤ −1.5 | 0.5 < Q ≤ −0.5 | 1.5 < Q ≤ 0.5 | 2.5 < Q ≤ 1.5 | Q ≥ 2.5 |
|---|---|---|---|---|---|---|---|
| I ≥ 2.5 | +3/−3 | +3/−2 | +3/−1 | +3/0 | +3/+1 | +3/+2 | +3/+3 |
| 2.5 < I ≤ 1.5 | +2/−3 | +2/−2 | +2/−1 | +2/0 | +2/+1 | +2/+2 | +2/+3 |
| 1.5 < I ≤ 0.5 | +1/−3 | +1/−2 | +1/−1 | +1/0 | +1/+1 | +1/+2 | +1/+3 |
| 0.5 < I ≤ −0.5 | 0/−3 | 0/−2 | 0/−1 | 0/0 | 0/+1 | 0/+2 | 0/+3 |
| −0.5 < I ≤ −1.5 | −1/−3 | −1/−2 | −1/−1 | −1/0 | −1/+1 | −1/+2 | −1/+3 |
| −1.5 < I ≤ −2.5 | −2/−3 | −2/−2 | −2/−1 | −2/0 | −2/+1 | −2/+2 | −2/+3 |
| I < −2.5 | −3/−3 | −3/−2 | −3/−1 | −3/0 | −3/+1 | −3/+2 | −3/+3 |

Those skilled in the art will understand that Table 1 and FIG. 7 merely represents one example of a 16-QAM embodiment, and other valid symbol windows and marginal threshold windows may be defined in other embodiments of the present invention. Also, different feed back to each DFE 32a may be utilized in other embodiments. For example, in another embodiment if any invalid symbol is detected, such as the invalid symbols (+2,−2) or (+3,−2) previously discussed, a value of zero could be fed back to the each of the DFEs 32a instead of feed backing the actual detected values as previously discussed. In another embodiment, a feedback determining function could be utilized to calculate the value fed back to each of the DFEs 32a when an invalid symbol is detected, with the calculated value being a function of the value of the invalid symbol.

One skilled in the art will understand that even though various embodiments and advantages of the present invention have been set forth in the foregoing description, the above disclosure is illustrative only, and changes may be made in detail, and yet remain within the broad principles of the invention. For example, many of the components described above may be implemented using either digital or analog circuitry, or a combination of both, and also, where appropriate, may be realized through software executing on suitable processing circuitry. It should also be noted that the functions performed by the decision block 30a and feedback modification circuit 102, for example, can be combined to be performed by fewer elements. Therefore, the present invention is to be limited only by the appended claims.

What is claimed is:

1. A burst error limiting symbol detector system, comprising:
   a decision circuit responsive to a corrected sample signal for detecting multilevel or multidimensional symbols encoded in the corrected sample signal with reference to a plurality of associated thresholds;
   a feedback egualizer circuit for providing a feedback egualizer signal for cancelling undesired distortion in an input signal;
   a summing circuit operable responsive to the input signal and the feedback egualizer signal for providing the corrected sample signal to the decision circuit; and
   a feedback modification circuit operable responsive to the corrected sample being within one of a plurality of valid symbol windows to feed back the detected symbol to the feedback egualizer and operable responsive to the corrected sample being within one of plurality of marginal threshold windows to feed back a corresponding intermediate value to the feedback egualizer,
   wherein the feedback modification circuit comprises:

a plurality of marginal window comparators, each marginal window comparator having a first input coupled to receive the corrected sample signal and a second and third inputs adapted to receive corresponding marginal threshold signals, and having an output;

a multiplexer coupled to the output of the detection logic circuitry to receive the detected value of each multilevel or multidimensional symbol on a first input and including a plurality of additional inputs respectively to receive a plurality of predetermined invalid symbol values, the multiplexer operable to supply a value on one of the inputs responsive to a plurality of control signals; and feedback logic circuitry coupled to the multiplexer and operable to develop the control signals responsive to the outputs from the plurality of marginal window comparators.

2. The burst error limiting symbol detector system of claim 1 wherein the corresponding intermediate value comprises the original value of the input signal.

3. The burst error limiting symbol detector system of claim 1 wherein the corresponding intermediate value comprises the corrected sample.

4. The burst error limiting symbol detector system of claim 1 wherein the corresponding intermediate value comprises a value determined according to table of predetermined values.

5. The burst error limiting symbol detector system of claim 1 wherein the corresponding intermediate value comprises a value that is generated according to a feedback determining function.

6. The burst error limiting symbol detector system of claim 1 wherein the marginal threshold windows are dynamically determined.

7. The burst error limiting symbol detector system of claim 1 wherein the multilevel or multidimensional symbols comprise one of PAM and QAM symbols.

8. The burst error limiting symbol detector system of claim 1 wherein the decision circuit comprises:

a plurality of window comparators, each window comparator having a first input coupled to receive the corrected sample signal and a second and third inputs adapted to receive a corresponding threshold signals, and having an output;

detection logic circuitry coupled to the outputs of the comparators, the detection logic circuitry operable to detect a value for each multilevel or multidimensional symbol from the corresponding comparator outputs and to apply the value for the symbol on an output.

9. A communications system, comprising:
a communications channel;
an encoder/transmitter adapted to receive input data containing multilevel or multidimensional symbols to be communicated over the communications channel; and
a receiver including,
a filter coupled to the communications channel to receive a signal containing symbols being communicated over the channel, and operable to generate a filtered signal responsive to the signal;
a sampling circuit coupled to the filter and operable to sample filtered signal and provide samples on an output;
a decision circuit responsive to a corrected sample signal for detecting multilevel or multidimensional symbols encoded in the corrected sample signal with reference to a plurality of associated thresholds;

a feedback equalizer circuit for providing a feedback equalizer signal for cancelling undesired distortion in an input signal;
a summing circuit coupled to the sampling circuit and operable responsive to the samples from the sampling circuit and the feedback equalizer signal to provide the corrected sample signal to the decision circuit; and
a feedback modification circuit operable responsive to the corrected sample being within one of a plurality of valid symbol windows to feed back the detected symbol to the feedback equalizer and operable responsive to the corrected sample being within one of plurality of marginal threshold windows to feed back a corresponding intermediate value to the feedback equalizers;
wherein the feedback modification circuit comprises,
a plurality of marginal window comparators, each marginal window comparator having a first input counled to receive the corrected sample signal and a second and third inputs adapted to receive corresponding marginal threshold signals, and having an output;
a multiplexer coupled to the output of the detection logic circuitry to receive the detected value of each multilevel or multidimensional symbol on a first input and including a plurality of additional inputs respectively to receive a plurality of predetermined invalid symbol values, the multiplexer operable to supply a value on one of the inputs responsive to a plurality of control signals; and
feedback logic circuitry coupled to the multiplexer and operable to develop the control signals responsive to the outputs from the plurality of marginal window comparators.

10. The communications system of claim 9 wherein the communications channel comprises a wireless communications channel.

11. The communication channel of claim 9 wherein the communications channel comprises one of a telephone line, coaxial cable, or bus in a computer system.

12. A method of controlling feedback to a decision feedback equalizer in a multilevel or multidimensional symbol system, the method comprising:
detecting whether a corrected sample signal falls within one of a plurality of valid symbol windows;
when the corrected sample signal falls within one of the plurality of valid symbol windows,
generating a symbol corresponding to the valid symbol window containing the sample signal, and
applying the generated symbol to the decision feedback equalizer;
detecting whether the corrected sample signal falls within one of a plurality of marginal threshold windows; and
when the corrected sample signal falls within one of the plurality of marginal threshold windows,
generating a plurality of feedback selection signals, each feedback selection signal being generated responsive to the corrected sample signal and corresponding first and second marginal threshold signals,
responsive to the feedback selection signals, providing a feedback signal from among one of the detected value of the multilevel or multidimensional symbol and a plurality of predetermined invalid symbol values. and
applying the feedback signal to the decision feedback equalizer.

13. The method of claim 12 further comprising:
generating the corrected sample signal responsive to an input signal and the feedback signal; and
wherein the corresponding intermediate value comprises the original value of the input signal.

14. The method of claim 12 wherein the corresponding intermediate value comprises the corrected sample signal.

15. The method of claim 12 wherein the corresponding intermediate value comprises a value determined according to table of predetermined values.

16. The method of claim 12 wherein the corresponding intermediate value comprises a value that is generated according to a feedback determining function.

17. The method of claim 12 further comprising predetermining the marginal threshold windows.

18. The method of claim 12 wherein each of the valid symbol windows and each of the marginal threshold windows comprises a range of amplitudes defined by first and second amplitude values.

19. The method of claim 12 wherein at least some of the valid symbol windows and the marginal threshold windows comprise ranges of phase shifts associated with valid symbols and invalid symbols, respectively.

* * * * *